US006508483B1

(12) United States Patent
Frank

(10) Patent No.: US 6,508,483 B1
(45) Date of Patent: *Jan. 21, 2003

(54) SIDECAR STEERING AID

(76) Inventor: Gerhard Frank, 10611 W. Orange Grove Rd., Tucson, AZ (US) 85743

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/748,500

(22) Filed: Dec. 20, 2000

(51) Int. Cl.[7] .............................................. B62K 27/00
(52) U.S. Cl. ..................... 280/203; 280/89.11
(58) Field of Search .............................. 280/203, 89.11, 280/90, 219, 210

(56) References Cited

U.S. PATENT DOCUMENTS

| | | | | | |
|---|---|---|---|---|---|
| 1,270,186 A | * | 6/1918 | Merz | ........................... | 280/203 |
| 4,415,056 A | * | 11/1983 | Smith | ........................... | 180/210 |
| 4,822,012 A | * | 4/1989 | Sketo | ........................ | 280/89.11 |
| 4,962,834 A | * | 10/1990 | Miner | ................... | 188/321.11 |
| 6,237,904 B1 | * | 5/2001 | Shepherd | ..................... | 267/150 |
| 6,283,489 B1 | * | 9/2001 | Hoog | ....................... | 280/455.1 |

FOREIGN PATENT DOCUMENTS

| | | | | | |
|---|---|---|---|---|---|
| AU | 103501 | * | 3/1938 | ................... | 280/203 |
| GB | 4248 | * | 2/1912 | .................... | 280/45 |
| GB | 2214883 | * | 9/1989 | .................. | 280/203 |

* cited by examiner

*Primary Examiner*—Daniel G. DePumpo
(74) *Attorney, Agent, or Firm*—Birdwell, Janke & Durando, PLC

(57) ABSTRACT

A sidecar steering aid. A coupling mechanism is provided for coupling the sidecar to a steering member of a vehicle to which the sidecar is attached. The coupling mechanism includes a spring adapted to provide resistance to compression and tension about a neutral position of the spring. The neutral position is biased with respect to the turning wheel so that the wheel is "cocked" a predetermined amount by the spring.

3 Claims, 1 Drawing Sheet

SIDECAR STEERING AID

BACKGROUND OF THE INVENTION

The invention relates generally to a sidecar steering aid, particularly for a sidecar driven by a motorcycle.

Motorcycle sidecars provide motorists the experience of riding a motorcycle while at the same time providing some of the carrying capacity of a small automobile. This greatly enhances the practicality of the motorcycle as a multiple use vehicle. However, sidecars for motorcycles significantly affect the handling characteristics of the motorcycle. Moreover, because the sidecar is typically mounted on one side of the motorcycle or the other, it applies forces on the motorcycle that are not balanced, and the rider must correct for these imbalanced forces. A significant one of these forces is aerodynamic drag. The drag force on the sidecar is applied to one side of the motorcycle and not the other, which tends to force the motorcycle to the left or to the right. Therefore, if the rider desires to travel straight ahead, he or she must correct for this drag force by turning ("cocking") the front wheel slightly in the opposite direction. However, in response, road forces are exerted on the front tire tending to maintain a straight direction of travel for the front wheel. The rider must therefore exert a constant force on the handlebars of the motorcycle to maintain the "cocked" orientation of the front wheel against these road forces. This is tiring for the rider, and detracts substantially from his or her enjoyment of riding the motorcycle.

Accordingly, there is a need for a sidecar steering aid that provides for reducing or eliminating the steering force required to maintain a straight-ahead direction of travel for the vehicle to which the sidecar is attached.

SUMMARY OF THE INVENTION

The sidecar steering aid according to the present invention solves the aforementioned problem and meets the aforementioned need by providing a coupling mechanism for coupling the sidecar to a steering member of a vehicle to which the sidecar is attached, typically the front fork of a motorcycle. The coupling mechanism provides for control of movement between the turning wheel of the vehicle and the sidecar. The coupling mechanism includes a spring adapted to provide resistance to compression and tension about a neutral position of the spring. The neutral position is biased with respect to the turning wheel so that the wheel is "cocked" a predetermined amount by the spring, relieving the rider from this task.

Preferably, the coupling mechanism also includes a shock absorbing or dampening element to resist movement as a function of the velocity of the movement.

Therefore, it is a principal object of the present invention to provide a novel and improved sidecar steering aid.

It is another object of the present invention to provide a sidecar steering aid that provides for reducing or eliminating the steering force required to maintain a straight-ahead direction of travel for the vehicle to which the sidecar is attached.

The foregoing and other objects, features and advantages of the present invention will be more readily understood upon consideration of the following detailed description of the invention, taken in conjunction with the following drawings.

DETAILED DESCRIPTION OF A PREFERRED EMBODIMENT

Figure 1:
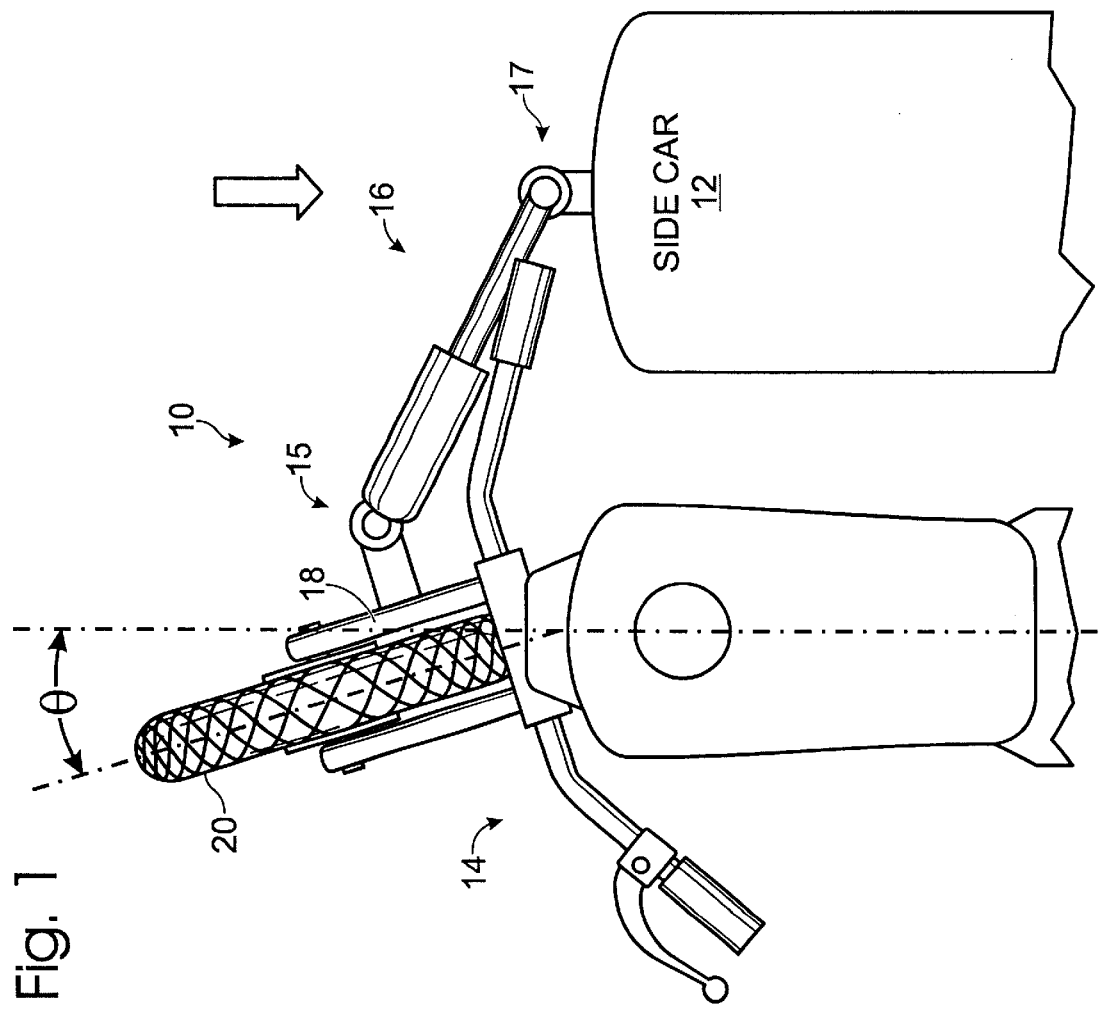
FIG. 1 is a plan view of a sidecar steering aid according to the present invention.

Referring to FIG. 1, a sidecar steering aid 10 according to the present invention is shown. The steering aid 10 is particularly adapted for use with a sidecar 12 adapted for attachment to a motorcycle 14; however, a steering aid according to the present invention may be employed with suitable modification for a sidecar adapted for attachment to a bicycle, or to a three wheeled or four wheeled vehicle, without departing from the principles of the invention.

The steering aid 10 includes a coupling mechanism 16 which connects, at one end 15 of the coupling mechanism, to the front fork 18 of the motorcycle and, at the other end 17 of the coupling mechanism, to the sidecar 12. The coupling mechanism is adapted to provide a coupling between the front wheel 20 of the motorcycle and the sidecar that is controlled in the manner described below.

Figure 2:
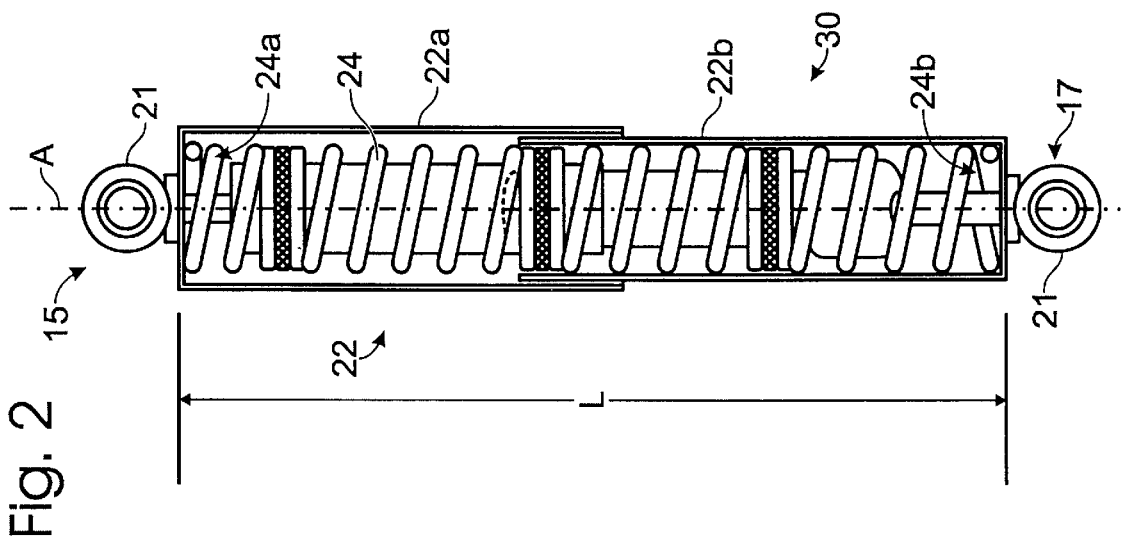
FIG. 2 is a cut-away view of a coupling mechanism according to the present invention for use with the sidecar steering aid of FIG. 1.

Referring to FIG. 2, a preferred embodiment of the coupling mechanism 16 is shown in detail. The ends 15 and 17 of the coupling mechanism include suitable connecting members 21 for connecting, respectively, the fork 18 which turns with the wheel 20 and the sidecar 12. The connecting members shown may be received by a clevis and pin.

The coupling mechanism 16 has a housing 22 that includes two housing portions 22a and 22b that are extendable with respect to one another along a longitudinal axis "A" of the mechanism. Respective ends 24a, 24b of a coil spring 24 are attached to each housing portion. The spring allows the mechanism to lengthen or contract along the axis "A", wherein a neutral length "L" of the mechanism is maintained in the absence of force applied to the spring. Referring back to FIG. 1, the length "L" is arranged, by suitable provision of the spring 24, so that the front wheel 20 is "cocked" a predetermined angle θ with respect to the forward direction, in the neutral position of the spring.

As speed increases, drag or other forces exerted on the sidecar in the direction of the arrow increase, tending to turn the motorcycle in the direction of the sidecar, e.g., to the right in FIG. 1. This places the spring 24 in tension, reducing the angle θ and therefore the steering correction required by the rider.

The spring constant (i.e., the force required to extend or compress the spring a given amount) of the spring 24 is selected as a compromise. The spring must be weak enough so that the wheel can be turned by the rider in either direction at all speeds when turning is desired. On the other hand, the spring should be strong enough to pull the fork 18 as close as possible to zero against the drag or other forces exerted on the sidecar.

Ideally, the spring constant for the spring 24 is selected so that the angle θ is precisely reduced to zero by tension in the spring at a design speed for which complete compensation of the drag or other forces on the sidecar is desired. The motorcycle therefore tracks straight ahead at the design speed without requiring the rider to exert any force on the handlebars. Though the rider must exert some force on the handlebars to travel straight ahead at lower speeds, there is less force to contend with at such lower speeds and, often, most of the rider's riding is at or near the design speed, so that a net benefit is provided by the invention.

Returning to FIG. 2, preferably the coupling mechanism 16 includes a dampening element 30 such as in a common shock absorber. The dampening element is provided to stabilize the spring coupling between the motorcycle and sidecar, by dampening oscillations induced by the spring 24.

It is to be recognized that, while a particular sidecar steering aid has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A transportation device, comprising:
   a motorcycle having a front wheel and a front fork member that turns with the front wheel;
   a sidecar; and
   a steering aid comprising a coupling mechanism attached to the sidecar and to the front fork member and adapted to apply restoring forces of tension and compression therebetween, said restoring forces being equal to zero when the turning angle of the front wheel is at an orientation defined such that the motorcycle is poised to turn in the direction opposite to that of the sidecar when the motorcycle and sidecar are at rest, and becoming nonzero with deviation of the turning angle from said orientation such that said force of tension increases when the turning angle is made to be greater than said orientation, and said force of compression increases when the turning angle is made to be less than said orientation.

2. The transportation device of claim 1, wherein said steering aid comprises a coiled spring to provide said restoring forces.

3. The transportation device of claim 2, wherein said steering aid further comprises a dampening element adapted to dampen movement of said spring.

* * * * *